US012065723B2

(12) United States Patent
Lagoon et al.

(10) Patent No.: US 12,065,723 B2
(45) Date of Patent: Aug. 20, 2024

(54) METHOD FOR PRODUCING AN IMPROVED DUCTILE IRON ALLOY WITH PEARLITIC MATRIX

(71) Applicant: Verdeloong Enterprises Pty. Ltd., Shepparton (AU)

(72) Inventors: Mathew Lagoon, Byrneside (AU); Colin Lagoon, Tamborine Mountain (AU)

(73) Assignee: Verdeloong Enterprises Pty. Ltd., Victoria (AU)

( * ) Notice: Subject to any disclaimer, the term of this patent is extended or adjusted under 35 U.S.C. 154(b) by 641 days.

(21) Appl. No.: 16/167,638

(22) Filed: Oct. 23, 2018

(65) Prior Publication Data

US 2019/0119795 A1    Apr. 25, 2019

(30) Foreign Application Priority Data

Oct. 23, 2017    (AU) .................................. 2017904280

(51) Int. Cl.
*C22C 33/08* (2006.01)
*C21C 1/10* (2006.01)
(Continued)

(52) U.S. Cl.
CPC .............. *C22C 33/08* (2013.01); *C21C 1/105* (2013.01); *C21C 7/0075* (2013.01); *C22C 28/00* (2013.01);
(Continued)

(58) Field of Classification Search
CPC ................................ C22C 33/08; C22C 30/08
See application file for complete search history.

(56) References Cited

U.S. PATENT DOCUMENTS

| | | | | |
|---|---|---|---|---|
| 2009/0007995 | A1* | 1/2009 | Brown ..................... | C21D 5/00 148/543 |
| 2010/0322813 | A1* | 12/2010 | Bouse ...................... | C21D 5/00 420/17 |

FOREIGN PATENT DOCUMENTS

| | | | | |
|---|---|---|---|---|
| CN | 101705422 | A * | 5/2010 | ............. C22C 37/04 |
| GB | 645862 | A * | 11/1950 | ............. C22C 37/04 |

OTHER PUBLICATIONS

Cast Iron Foundry Practices, Casting, vol. 15, ASM Handbook, Edited By Srinath Viswanathan, Diran Apelian, Raymond J. Donahue, Babu DasGupta, Michael Gywn, John L. Jorstad, Raymond W. Monroe, Mahi Sahoo, Thomas E. Prucha, Daniel Twarog, ASM International, 2008, p. 812-834. (Year: 2008).*

(Continued)

*Primary Examiner* — Keith D. Hendricks
*Assistant Examiner* — Joshua S Carpenter
(74) *Attorney, Agent, or Firm* — BURNS & LEVINSON LLP

(57) ABSTRACT

A method for producing ductile iron alloys and products thereof, and in particular ductile iron alloys with at least a partial pearlitic structure, is disclosed. The improved ductile iron alloy may be used in vehicle parts, in particular disc brake rotors. The method for producing a ductile iron alloy includes heating an initial composition in a furnace to produce a molten mixture, transferring the molten mixture to an inoculation ladle, inoculating the molten mixture with an inoculant for a predetermined inoculation time to produce an inoculated molten mixture, and pouring the inoculated molten mixture into a mold to produce a ductile iron alloy with at least a partial pearlitic structure.

19 Claims, 3 Drawing Sheets

(51) Int. Cl.
　　　C21C 7/00　　　　(2006.01)
　　　C22C 28/00　　　(2006.01)
　　　C22C 33/10　　　(2006.01)
　　　C22C 37/08　　　(2006.01)
　　　C22C 37/10　　　(2006.01)
(52) U.S. Cl.
　　　CPC .............. *C22C 33/10* (2013.01); *C22C 37/08*
　　　　　　　　　　　(2013.01); *C22C 37/10* (2013.01)

(56)　　　　　　References Cited

OTHER PUBLICATIONS

Google Patents translation of CN101705422A retrieved on Jun. 6, 2021 (Year: 2010).*
Dictionary of Metals—steel. (2012). (pp. 219). ASM International. (Year: 2012).*
Olawale, J. O., S. A. Ibitoye, and K. M. Oluwasegun. "Processing techniques and productions of ductile iron: A review." International Journal of Scientific & Engineering Research 7.9 (2016): 397-423 (Year: 2016).*
J.L. Dossett, Introduction to Cast Iron Heat Treatment, Cast Iron Science and Technology, vol. 1A, ASM Handbook, Edited By Doru M. Stefanescu, ASM International, 2017, p. 228-239, (Year: 2017).*
Dong, J. M., and W. Henning. "Effects of Barium/Cerium Combinations in Magnesium—Ferrosilicon on Ductile Iron." 82 nd Annual Meeting. 1978. (Year: 1978).*

* cited by examiner

Figure 3: Burnish friction effectiveness vs stop no.
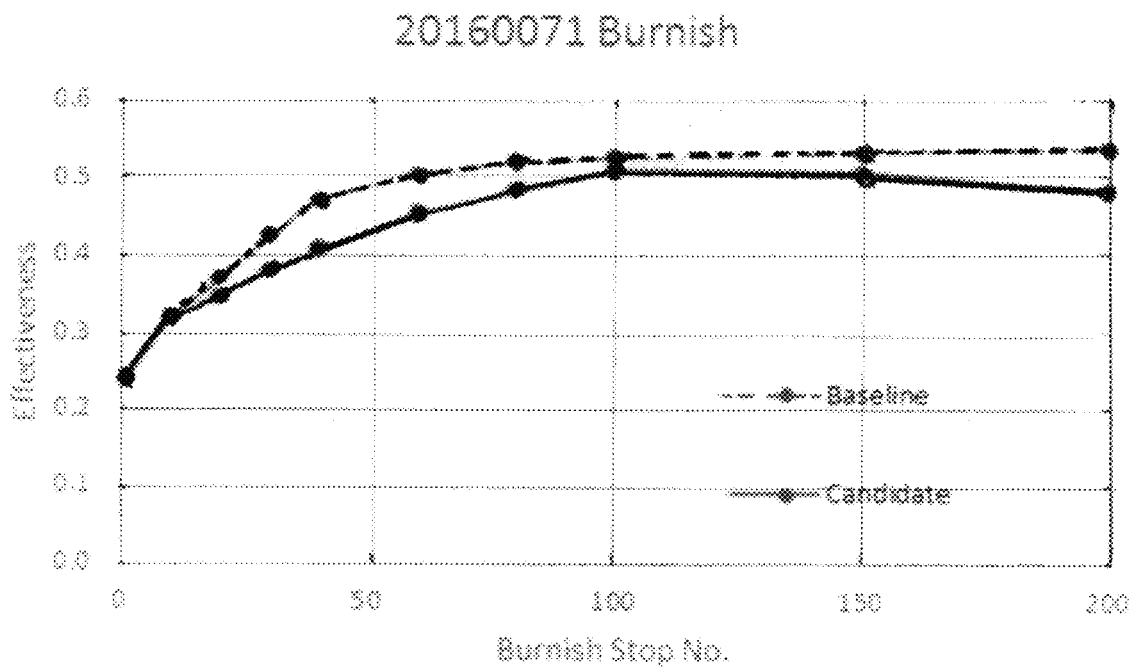
Figure 4: Thermal shock friction effectiveness vs stop no.
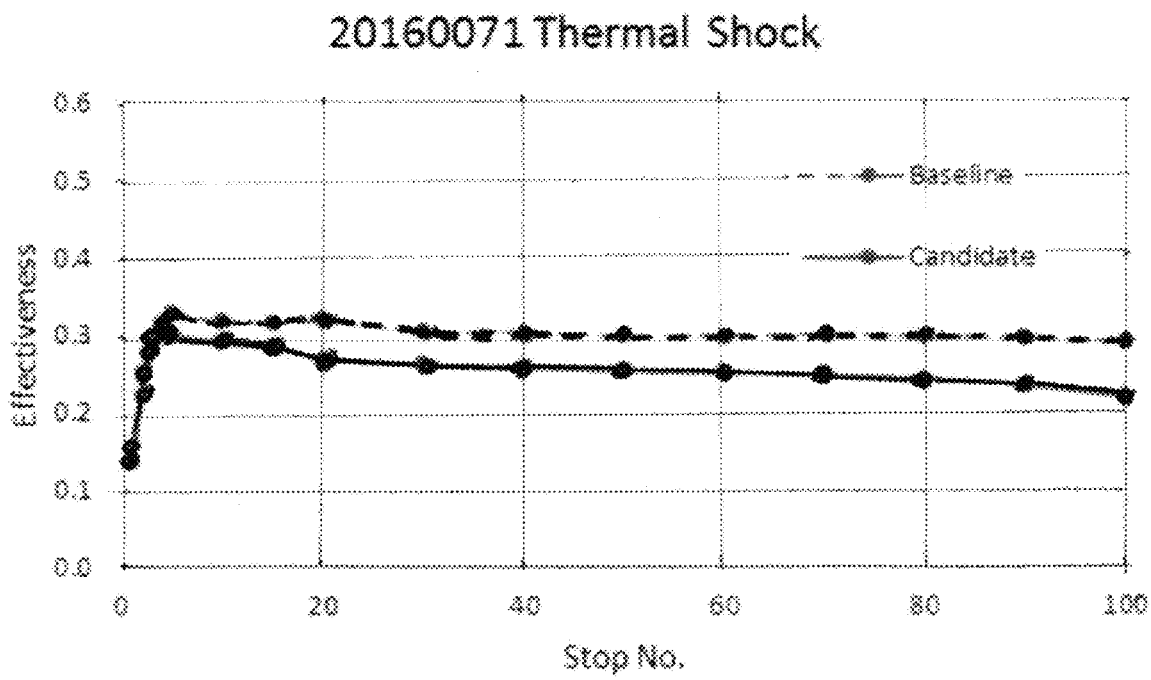

METHOD FOR PRODUCING AN IMPROVED DUCTILE IRON ALLOY WITH PEARLITIC MATRIX

CROSS-REFERENCE TO RELATED APPLICATIONS

This application claims priority to Australian Provisional Application No. 2017904280 filed on Oct. 23, 2017, which is hereby incorporated by reference in its entirety.

FIELD OF THE INVENTION

The present invention relates to ductile iron alloys and in particular to ductile iron alloys with at least a partial pearlitic structure.

The invention has been developed primarily for providing vehicle parts, particularly disc brake rotors, and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Disc brake rotors are arranged in machinery to rotate with a rotating member and assist in the deceleration of such rotation. They are commonly constructed with two oppositely-facing annular friction surfaces which, when engaged by friction-providing surfaces of a brake, provide a frictional force to decelerate the rotating member. Such brake rotors are commonly used in machinery to decelerate components such as wheels or gears—particularly in motor vehicles.

Presently, commercial disc brake rotors are most commonly constructed of grey cast iron, which are characterised by their graphitic microstructure. However, on testing, the inventors have found such brake rotors to be inadequate in longevity, thermal resistance, and their ability to dissipate the heat from braking, particularly when the brake rotors are subject to frequent and/or intense thermal stress—for example, during motor vehicle racing.

Accordingly, the inventors have sought to develop an improved iron alloy which may be used in a disc brake rotor.

OBJECT OF THE INVENTION

It is an object of the present invention to overcome or ameliorate at least one of the disadvantages of the prior art, or to provide a useful alternative.

It is an object of the invention in its preferred form to provide an improved ductile iron alloy, which may be utilised in the construction of a disc brake rotor.

SUMMARY OF THE INVENTION

According to a first aspect of the invention, there is provided a method for producing a ductile iron alloy, comprising the steps of:
  i) heating an initial composition in a furnace to produce a molten mixture;
  ii) transferring said molten mixture to an inoculation ladle;
  iii) inoculating said molten mixture with an inoculant for a predetermined inoculation time to produce an inoculated molten mixture;
  iv) pouring said inoculated molten mixture into a mold to produce a ductile iron alloy with at least a partial pearlitic structure.

Preferably, the inoculant includes one or more of ferrosilicon, calcium, aluminium, copper, and molybdenum. More preferably, the ferrosilicon is magnesium ferrosilicon.

Preferably, the inoculant is covered by a covering means to provide a controlled release of said inoculant in step (iii). In preferred embodiments, the covering means is a steel covering.

The controlled release preferably occurs after substantially all of the molten mixture is transferred into the inoculation ladle. In other preferred embodiments, the controlled release occurs about 20 seconds after step (ii).

In a preferred embodiment, the partial pearlitic structure is about 30% to 50% of the structure. In a more preferred embodiment, the partial pearlitic structure is about 40% to 45% of the structure.

In a particular embodiment, the partial pearlitic structure is about 30% of the structure. In a further particular embodiment, the partial pearlitic structure is about 50% of the structure.

Preferably, the initial composition is provided by a combination of steel scrap, pig iron, and further additives.

More preferably, the further additives include one or more of a ferrosilicon alloy, a ferromolybdenum alloy, and a recarburiser.

In one particular embodiment, copper molybdenum maybe included in the formulation to assist with corrosion resistance.

In a preferred embodiment, the molten mixture comprises:
  about 3.5% to 4.25% carbon,
  about 2.4% to 2.5% silicon,
  about 1% to 1.175% molybdenum,
  about 0.039% to 0.05% magnesium,
  about 0.07% nickel,
  about 0.034% chromium,
  up to about 0.20% manganese,
  up to about 0.02% phosphorus,
  up to about 0.02% sulfur, and
  iron to make 100%.

In a more preferred embodiment, the molten mixture comprises:
  about 3.5% to 3.75% carbon,
  about 2.4% to 2.5% silicon,
  about 1.175% molybdenum,
  about 0.039% magnesium,
  about 0.07% nickel,
  about 0.034% chromium,
  up to about 0.20% manganese,
  up to about 0.02% phosphorus,
  up to about 0.02% sulfur, and
  iron to make 100%.

Preferably, the furnace is an induction core furnace.

In a preferred embodiment, in step (ii), the furnace is heated to a minimum internal temperature of about 1400° C. More preferably, the furnace is heated to an internal temperature in the range of about 1400-1700° C., or 1450-1600° C., or 1470-1580° C., or any range therebetween. For example, in a preferred embodiment, the furnace is heated to an internal temperature of about 1400° C., 1420° C., 1450° C., 1500° C., 1550° C., 1600° C., 1650° C., or 1700° C., or any temperature therebetween.

In a particular preferred embodiment, in step (ii), the furnace is heated to an internal temperature of about 1470° C.

In another particular preferred embodiment, in step (ii), the furnace is heated to an internal temperature of about 1580° C.

In further particular preferred embodiment, in step (ii), the furnace is heated to an internal temperature of about 1600° C.

Preferably, in step (ii), cerium is added to the molten mixture. More preferably, the cerium is added at about 0.25% to 0.55% by weight of the molten mixture. For example, in a preferred embodiment, the cerium is added at about 0.25%, 0.30%, 0.35%, 0.40%, 0.45%, 0.50%, or 0.55%, or any percentage therebetween.

Cerium and magnesium to some extent work cooperatively. Magnesium as it is heated reverts to a vapour. As temperature increases in the furnace, more magnesium will be lost to vapour. Accordingly, cerium is used to prolong the presence of magnesium. Cerium vaporises at a higher temperature but is more potent than magnesium. Accordingly, the reaction is then "taken over" by cerium and the magnesium remains available for the alloy.

Preferably, in step (iii), the predetermined inoculation time is between about 3 minutes and 10 minutes. More preferably, the predetermined inoculation time is between about 5 to 6 minutes.

In a preferred embodiment, the inoculation ladle includes a pocket for housing the inoculant. This pocket is designed to enclose the inoculant, such as to restrict the contact area available to the molten steel, and hence control the inoculation time.

Preferably, the inoculant is added to the inoculation ladle prior to step (ii). More preferably, the inoculant is added to the inoculant ladle about 15-20 seconds prior to transferring the molten steel to the inoculant ladle.

In alternative embodiments, the inoculant may be added to the inoculation ladle after step (ii).

Preferably, the inoculation ladle is dimensioned to have a height about 1.5 times the length of its diameter. More preferably, the inoculation ladle has an insulating layer of about 6 mm between an internal lining and an external steel shell. In a more preferable embodiment, the internal lining consists of about 80% alumina and has a thickness of up to 75 mm.

In an embodiment, the method further comprises a step between steps (iii) and (iv) wherein said inoculated molten mixture is transferred from said inoculation ladle to a pouring ladle for pouring in step (iv). In a preferred embodiment, a second inoculant is added to said inoculated molten mixture during said transferring from said inoculation ladle to said pouring ladle. This second inoculant may assist in maintaining the pearlite structure during transfer process and reduce impurities in the resultant ductile iron alloy.

Preferably said second inoculant comprises:
about 1.10% to 1.20% calcium,
about 0.8% to 1.0% aluminium, and
about 0.05% silicon.

Alternatively, said second inoculant comprises:
about 72-78% silicon,
about 2-3% barium,
about 1-2% calcium, and
about 0-1.5% aluminium.

In a further preferred embodiment, the resultant cast material can undergo suitable heat treatment. If the resultant cast material is for so-called light duty, it preferably undergoes a "normalising" or "low level annealing" treatment. In this embodiment, the material is removed from the mould and maintained at a temperature of 500° C. to 700° C. for up to 6 hours preferably 550° ° C. to 600° C. for 5 hours. The heat treatment is preferably conducted in the furnace. After the stabilisation at elevated temperature, the material undergoes a slow controlled cooling down to ambient temperature. Again, this preferred slow controlled cooling is conducted within the furnace.

In an alternative heat treatment, the cast material undergoes a high temperature "annealing" step. This is particularly useful for cast material which is intended to undergo heavy use such as disk brake rotors or the like for trucks, racing cars, etc. In this embodiment, the rough cast material is allowed to cool down to ambient temperature in the mould. This is a slow controlled cooling. The material is then placed in the furnace and held at a temperature of 750° ° C. to 1000° C. for up to 10 hours. Preferably, the temperature is 750° C. to 820° C. and is stabilised for 9 hours. After this "annealing" heat treatment, the material then undergoes a slow controlled cooling within the furnace down to ambient temperature.

In a preferable embodiment, the mould is for a vehicle part. Preferably, the vehicle is selected from the group comprising motor vehicles, heavy vehicles, railed vehicles, ships, and boats. In particular preferable embodiments, the vehicle part is selected from the group comprising disc brake rotors, turbo housings, camshafts, crankshafts, engine blocks, wheels, freight containers or barges, blocks, and carriages. More preferably, the vehicle part is a disc brake rotor.

In preferred embodiments of the invention, the disc brake rotor comprises about: 3.4% carbon, 2.4% silicon, and 1.15% (maximum) molybdenum. It was found that this preferred composition has soft nodules of graphite surrounded by relatively soft and ductile ferrite. These soft parts are strengthened and hardened by the pearlite phase and a very hard complex carbide phase.

According to a second aspect of the invention, there is provided a ductile iron alloy produced by the method according to the invention.

According to a third aspect of the invention, there is provided a vehicle part produced by the method according to the invention.

According to a fourth aspect of the invention, there is provided a disc brake rotor produced by the method according to the invention.

According to a fifth aspect of the invention, there is provided a ductile iron alloy comprising at least a partial pearlitic structure.

Preferably, the partial pearlitic structure is about 30% to 50% of the structure. More preferably, the partial pearlitic structure is about 40% to 45% of the structure.

In a particular embodiment, the partial pearlitic structure is about 30% of the structure.

In a further embodiment, the partial pearlitic structure is about 50% of the structure.

According to a sixth aspect of the invention, there is provided a disc brake rotor comprised of a ductile iron alloy with at least a partial pearlitic structure.

Preferably, the partial pearlitic structure is about 30% to 50% of the structure. More preferably, the partial pearlitic structure is about 40% to 45% of the structure.

In a particular embodiment, the partial pearlitic structure is about 30% of the structure.

In a further embodiment, the partial pearlitic structure is about 50% of the structure.

According to a seventh aspect of the invention, there is provided a method of improving the resistance to thermal stress cracking of a ductile iron alloy, comprising providing said ductile iron alloy with at least a partial pearlitic structure.

Preferably, the partial pearlitic structure is about 30% to 50% of the structure. More preferably, the partial pearlitic structure is about 40% to 45% of the structure.

In a particular embodiment, the partial pearlitic structure is about 30% of the structure.

In a further embodiment, the partial pearlitic structure is about 50% of the structure.

According to an eighth aspect, the present invention provides an inoculant for use in the production of a ductile iron cast alloy wherein as the iron alloy composition is being heated in a furnace it is contacted with a magnesium ferrosilicon-based inoculant, comprising about:

| | |
|---|---|
| 5-6% | magnesium |
| 44-45% | silicon |
| 1.2-2.0% | calcium |
| 0.8-1.0% | aluminium |
| 1.0-2.5% | barium |
| 0.3-0.5% | cerium |

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

BRIEF DESCRIPTION OF THE DRAWINGS

Preferred embodiments of the invention will now be described, by way of example only, with reference to the accompanying drawings in which:

FIG. 3 illustrates the differences in friction levels measured during a Wear vs Temperature test between a baseline disc brake rotor (Baseline) and a disc brake rotor according to the invention (Candidate); and FIG. 4 illustrates the differences in friction levels measured during a Thermal Shock test between a baseline disc brake rotor (Baseline) and a disc brake rotor according to the invention (Candidate).

DETAILED DESCRIPTION OF THE INVENTION

Partial Pearlitic Structure

Figure 1:
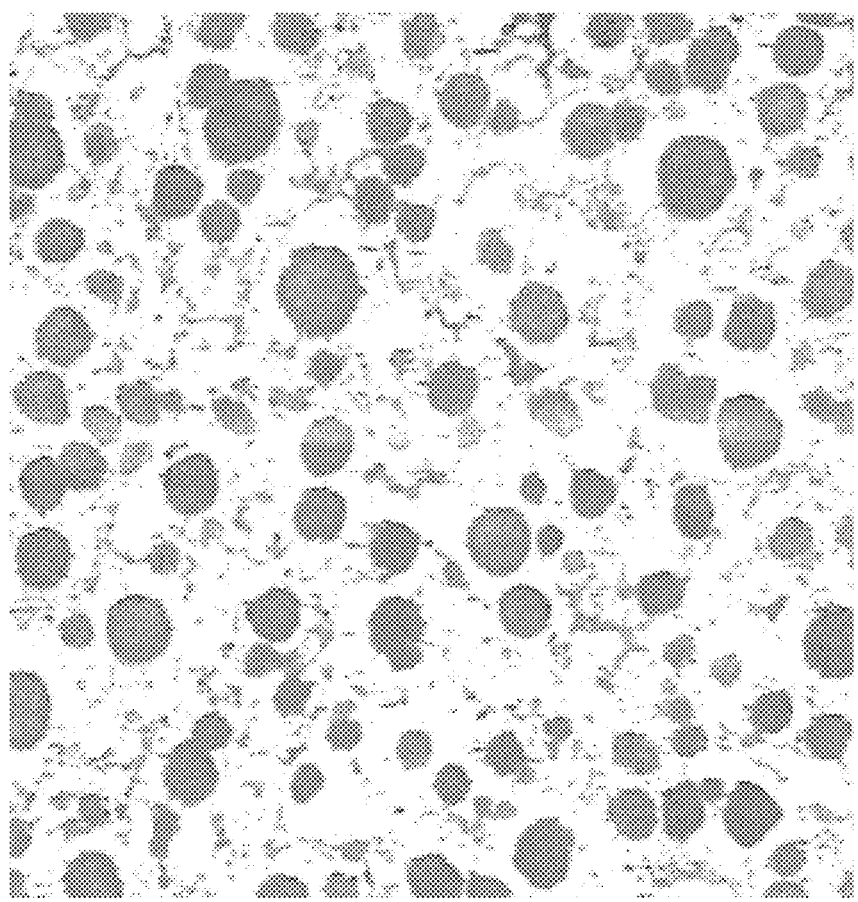
FIG. 1 is a microscope (×50) image of a ductile iron alloy produced in accordance with the method of the invention, illustrating its pearlitic structure, and copper and sulphite impurities.
Figure 2:
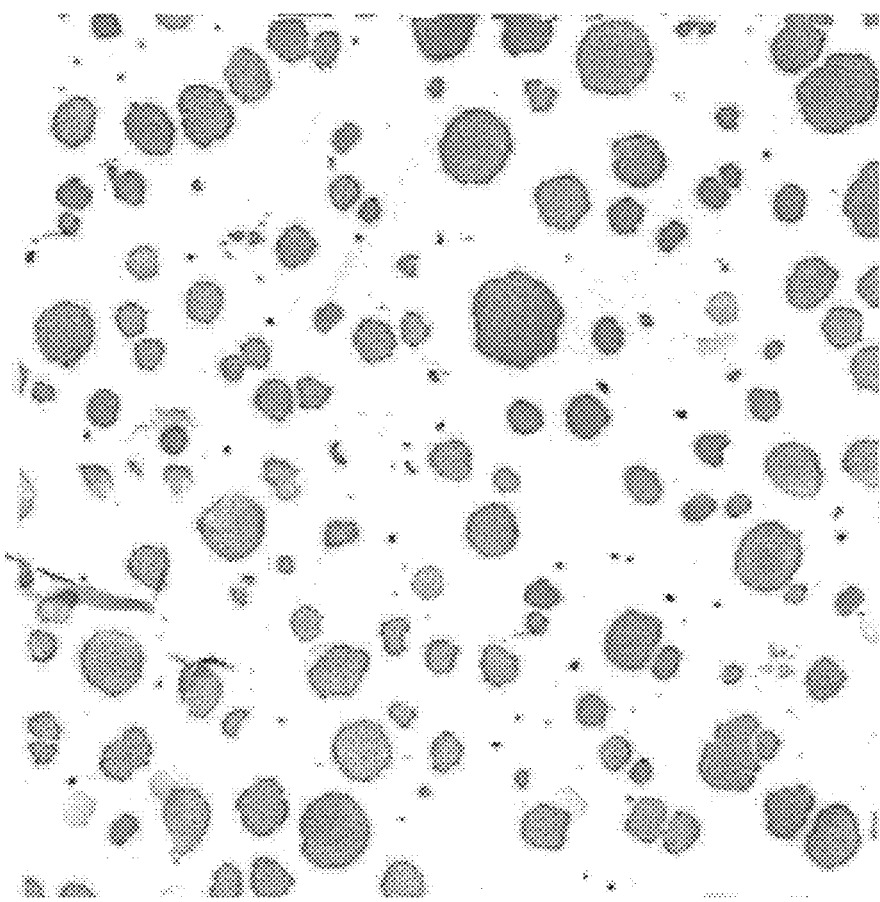
FIG. 2 is a microscope (×50) image of a ductile iron alloy produced in accordance with the method of the invention, illustrating its pearlitic structure.

The partial pearlitic structure of the ductile iron alloy of the invention can be seen in the microscope (×50) images of FIG. 1 (shown with copper and sulphite granule impurities caused by a low furnace temperature) and FIG. 2. In particular, the dark circles indicate the pearlite structure, and the light area therebetween indicates the ferritic structure.

The partial pearlite structure produced by the method of the invention has been found to provide a number of improvements over the conventional flake graphite structure of grey cast iron. In particular, the iron alloy with the pearlite structure improved the dissipation of heat across the iron alloy structure, and hence provided an increased resistance to thermal stress cracking. Through further testing, it was also found that this structure provided for a reduced friction coefficient.

Hence, in implementation, the improved iron alloy structure may provide for an improved longevity of the iron alloy when subjected to regular thermal loads, such as in disc brake rotors, which may lead to both economic and safety advantages. This may be particularly useful in logistics, transport and vehicle racing applications, in particular in braking products for cars, buses, trucks, trains, etc.

Furthermore, it will be appreciated that the pearlite composition of the structure is correlated to the Brinell hardness of the structure. As a specific example, a partial pearlitic structure of 50% correlated to a Brinell hardness of about 200 in the resulting ductile iron alloy.

In light of this correlation and the provided benefits of the present invention, the person skilled in the art would be led to recognise that there exists a trade-off between the hardness of the ductile iron alloy and the improvements to thermal dissipation and stress cracking, and that the partial pearlitic structure must be adjusted for particular applications.

For example, in testing, it has been found that a partial pearlitic structure of about 30% would be useful in common motor vehicle applications, such as a disc brake rotor in a car. Alternatively, a partial pearlitic structure closer to about 50% would be useful in heavier duty applications, such as a brake disc rotor for a mining vehicle or truck. Further uses of the invention in heavier duty applications can include uses in the production of turbo housings, camshafts, crankshafts, engine blocks, wheels, freight containers or barges, blocks, and carriages, particularly for use in heavy vehicles (such as mining vehicles), railed vehicles, ships, and boats.

Initial Composition

In the preferred embodiments of the invention, the initial composition is provided by a combination of steel scrap, pig iron, and further additives. The steel scrap, pig iron, and further additives are preferably clean of any rust. In a further preferred embodiment, they are also dry and free from oil.

Ideally, the steel scrap, pig iron, and further additives are in a form having a thin cross-section, such that they melted and dissolved faster into the molten steel form.

The initial composition preferably comprises of at least 40% steel scrap.

The steel scrap provides for the pearlitic matrix density of the structure, and also assists in nucleating austenite during the production process. The steel scrap composition preferably has a low level of manganese, alloy, and phosphorus impurities, and has a low oxygen activity (rust). The used steel scrap preferably does not have any zinc or tin coatings.

The pig iron provides for diluting and reducing the manganese and alloy impurities in the base composition to an acceptable level and provides a source of carbon that is easily dissolvable. The pig iron preferably is in the form of sorelmetal, and further preferably comprises low levels of phosphorus (0.02% max), sulphur (0.015% max) and titanium (0.04% max), and only trace levels of manganese and silicon.

Furthermore, it will be appreciated that any manganese, phosphorus (or phosphates), and sulphur (or sulphites) impurities in the initial composition can function as denodulising agents which assist in encapsulating the molybdenum and silicon in the pearlite structure produced by the invention. It is believed that these components in the pearlite structure promote the advantageous thermal conductivity of the ductile iron alloy.

Temperature of Furnace and Inoculation

In a preferred embodiment, in step (ii), the furnace is heated to a minimum internal temperature of about 1400° C.; however further embodiments may require the furnace heated to internal temperatures in the range of about 1400-1700° C., or 1450-1600° C., or 1470-1580° C., or any range therebetween.

It will be appreciated that these embodiments of the method of the invention involve a trade-off between the temperature of molten mixture in the furnace and the loss of chemical components in the mixture. In particular, the higher temperature provides a higher fluidity in the molten mixture and reduces impurities in the ferritic structure. These impurities can form with surrounding air pockets, which may form cracks in the iron alloy when put under stress. However, at these higher temperatures, magnesium is vaporised and lost to the atmosphere, and magnesium is necessary for the formulation of the pearlite structure.

Accordingly, in some embodiments, cerium can be added to the molten mixture in step (ii). The cerium acts as a stabilising agent for the magnesium at higher temperatures, and results in less vaporisation of the magnesium. In preferred embodiments, the cerium is added at about 0.25% to 0.55% by weight of the molten mixture. For example, in a preferred embodiment, the cerium is added at about 0.25%, 0.30%, 0.35%, 0.40%, 0.45%, 0.50%, or 0.55%, or any percentage therebetween. It will be appreciated that the addition of more cerium will result in a harder iron alloy.

Although the invention has been described with reference to specific embodiments, it will be appreciated by those skilled in the art that the invention may be embodied in many other forms.

Recycle of Waste Remnants

The inventors have found that the waste remnants of the invention in the furnace and/or the inoculation ladle may be recycled, reheated, remelted, and repoured to produce a further iron alloy product with a pearlitic structure.

It will be appreciated that this the produced recycle product has similar metallurgy as the first product; however, as the inoculants and magnesium are reacted in the first melt, the produced recycle product is typically harder than the first ductile iron alloy product. In some tests, the inventors found the Brinell hardness of the recycle product to be up to 20% harder. Accordingly, the recycle product should only be used in applications where hardness is required, such as in turbo housings, camshafts, crankshafts, engine blocks, wheels, freight containers or barges, blocks, and carriages. The recycle product may also be rolled out for use in ballistic plating.

Example 1—Process

A ductile iron product with a partial pearlitic structure was produced in accordance with the present invention and detailed as follows.

Into a 500 kg induction furnace, the following charge components were added as an initial composition:

| | |
|---|---|
| 400 kg | High grade clean steel scrap |
| 13.2 kg | Ferrosilicon |
| 16.2 kg | Carbonin 101 recarburiser |
| 8.0 kg | Ferro Molybdenum 67% alloy |

The initial composition was then heated to 1470° C. in the furnace in order to form a molten mixture and overcome the sluggish fluidity caused by the addition of the molybdenum alloy.

As the initial composition was being heated, a magnesium ferrosilicon-based inoculant was prepared, comprising about:

| | |
|---|---|
| 5-6% | magnesium |
| 44-45% | silicon |
| 1.2-2.0% | calcium |
| 0.8-1.0% | aluminium |
| 1.0.2.5% | barium |
| 0.3-0.5% | cerium |

The inoculant was in the form of 9 mm by 8 mm mesh and covered by a steel covering. The covered inoculant was then added to an inoculation ladle in the ratio of 1 kg inoculant per 500 kg molten mixture.

Immediately after the inoculant was added to the inoculation ladle, the molten mixture was poured into the inoculation ladle to be inoculated. The steel covering acts as a buffer to prevent the inoculant from immediately inoculating the molten mixture.

In a preferred embodiment, the impurities in the induction furnace are preferably removed e.g. by scooping/skimming the surface prior to the molten mixture being poured.

Once the entirety of the molten mixture was poured into the inoculation ladle, the mixture is left to inoculate for a period of about 6 minutes. After this time period, the inoculated molten mixture was transferred to a pouring ladle for casting into a mould.

On analysis of the produced iron alloy, it was found to be a ductile iron with a partial pearlite structure.

Example 2—Comparison Test of Invention Disc Brake Rotors

A disc brake rotor with a partial pearlitic structure was produced in accordance with the present invention and its performance was compared against a standard baseline grey iron rotor.

In particular, this comparison was conducted to assess any differences in the friction performance and the wear and crack resistance of the rotors. The methodology and results of this study are considered as below.

Test Parameters

The baseline and invention disc brake rotors were similarly set up with the following parameters:

TABLE 1

| Test parameters | | |
|---|---|---|
| Axle | (F/R) | F |
| Orientation | (L/R) | L |
| $V_{max}$ | (km/h) | 180 |
| Inertia | (kgm$^2$) | 93.0 |
| Equiv. Wheel Load | (kg) | 880 |
| Rolling radius | (mm) | 325 |
| Effective radius | (mm) | 136.5 |
| Piston diameter | (no. × mm) | 2 × 42 |

TABLE 2

| Rotor mass | | | |
|---|---|---|---|
| Baseline (kg) | Invention (kg) | Delta (kg) | Delta (%) |
| 10.214 | 7.877 | −2.337 | −23% |

For the purposes of this comparison, it is important to note that the produced invention rotor was considerably lighter than the baseline rotor (−23%).

All tests were conducted using a low-metal friction material BM987S. Each test was conducted with new brake pads and rotor embedded thermocouples.

Wear vs Temperature

In this test, the disc brake rotors were first burnished and then subjected to a number of stops from an initial speed of 80 km/h to a full stop at a deceleration of 0.3 g. Full details of the test schedule are as below:

TABLE 3

Wear vs Temperature test schedule

| Section | Stops | Initial speed (km/h) | Final speed (km/h) | Initial Temp (° C.) | Decel (g) | Torque (Nm) |
|---|---|---|---|---|---|---|
| Burnish | 200 | 65 | 0 | 100 | 0.4 | 1100 |
| 140° C. | 200 | 80 | 0 | 140 | 0.3 | 825 |
| 180° C. | 200 | 80 | 0 | 180 | 0.3 | 825 |
| 240° C. | 200 | 80 | 0 | 240 | 0.3 | 825 |
| 300° C. | 200 | 80 | 0 | 300 | 0.3 | 825 |

During this test, the average pad wear and rotor wear were measured:

TABLE 4

Wear vs Temperature

| | Baseline | | Invention | |
|---|---|---|---|---|
| | Avg Pad wear g/1000 stops | Avg Rotor wear g/1000 stops | Avg Pad wear g/1000 stops | Avg Rotor wear g/1000 stops |
| Burnish | 12.5 | 18.5 | 11.5 | 15.0 |
| 140° C. | 16.2 | 35.5 | 16.2 | 21.5 |
| 180° C. | 13.5 | 29.5 | 24.3 | 26.5 |
| 240° C. | 9.8 | 22.5 | 21.8 | 14.0 |
| 300° C. | 13.0 | 14.0 | 19.7 | 9.0 |
| Overall | 13.0 | 24.0 | 18.7 | 17.2 |
| Delta | — | — | 44% | −28% |

In terms of reduction mass (i.e. wear of the rotor and pad), it can be seen that overall rotor wear of the invention rotor is reduced by 28% compared to the baseline rotor; however, pad wear increased with the use of the invention rotor by 44%.

Thermal Shock

Following the Wear vs Temperature test, the baseline and invention disc brake rotors were then subject to a further Thermal Shock test, where the disc rotors were thermally cycled to determine the effects of thermal shock from sudden braking. Full details of the test schedule are as below:

TABLE 5

Thermal shock test schedule

| Section | Stops | Initial speed (km/h) | Final speed (km/h) | Initial Temp (° C.) | Decel (g) | Torque (Nm) |
|---|---|---|---|---|---|---|
| Burnish | | N/A—used rotor from Wear vs Temp test | | | | |
| Thermal Shock | 100 | 180 | 5 | 100 | 1.0 | 2750 |

The results of this test, shown with regards to the development or any cracks on the rotor faces, are shown as below:

TABLE 6

Thermal shock crack development

| | Baseline | | Invention | |
|---|---|---|---|---|
| Post Cycle | Outer Rotor Face | Inner Rotor Face | Outer Rotor Face | Inner Rotor Face |
| 10 | OK | OK | Hot spots | Hot spots |
| 20 | 2-3 mm cracks | 2 mm cracks | Hot spots | Hot spots |
| 30 | 5 mm | 3 mm | Hot spots | Hot spots |
| 40 | 8 mm | 5 mm | Hot spots | 5 mm crack |
| 50 | 10 mm | 5 mm | Hot spots | 10 mm |
| 60 | 15 mm | 5 mm | Hot spots | 10 mm |
| 70 | 20 mm | 8 mm | Hot spots | 10 mm |
| 80 | 25 mm | 10 mm | Hot spots | 10 mm |
| 90 | 25 mm | 10 mm | Hot spots | 12 mm |
| 100 | 28 mm | 12 mm | 8 mm crack | 15 mm |

TABLE 7

Average in-stop temperature rise in each section

| ° C. | Baseline | Invention | Delta |
|---|---|---|---|
| Burnish | 40 | 55 | 38% |
| 140° C. | 58 | 75 | 28% |
| 180° C. | 61 | 65 | 7% |
| 240° C. | 50 | 57 | 13% |
| 300° C. | 48 | 60 | 23% |
| Thermal Shock | 336 | 405 | 21% |

It was found that baseline rotor exhibited greater cracking, with the crack initiation beginning earlier in the test and the crack length being greater at the end. The invention rotor showed relatively few cracks when compared with the baseline.

It is noted that the invention rotor displayed considerable hot-spotting during the Thermal Shock test. The invention rotor also experienced greater in-stop temperature rise and peak temperatures, due largely to the lower mass (shown in Table 2).

The higher thermal loads in the invention rotor (likely due to the lower weight) combined with the lower rate of crack development indicates the invention rotor offers greater resistance to thermal cracking.

Friction

The friction levels were also measured throughout the Wear vs Temperature test, and the Thermal Shock test, summarised as follows:

TABLE 8

Friction level summary during Wear vs Temperature test (average friction levels for last 100 stops in each section)

| (mu) | Baseline | Invention |
|---|---|---|
| Burnish | 0.53 | 0.50 |
| 140° C. | 0.49 | 0.48 |
| 180° C. | 0.44 | 0.45 |
| 240° C. | 0.42 | 0.41 |
| 300° C. | 0.48 | 0.45 |
| Avg | 0.47 | 0.46 |

TABLE 9

| Friction level summary during Thermal Shock test | | |
|---|---|---|
| (mu) | Baseline | Invention |
| Avg | 0.30 | 0.26 |

In the Wear vs Temperature test, the invention rotor demonstrated a slightly lower average friction level overall with mu=0.46 compared to mu=0.47 for the baseline. The friction level difference was greater during the thermal shock with mu=0.26 for the invention rotor compared to mu=0.30 for the baseline rotor.

Further differences were also noted, within the different sections of the tests. For example, FIG. 3 shows the development of friction level during the burnish section of the Wear vs Temperature test. While friction levels were comparable by stop 100, it should be noted that the invention rotor took longer for the friction level to stabilise.

The invention rotor was also found to have lower friction levels throughout the Thermal Shock test, as shown in FIG. 4. This may be significantly influenced by the higher in-stop temperature rise (see Table 7) of the invention rotor.

Conclusions

When compared to the baseline rotor, the invention rotor demonstrated a reduced rotor wear (28%, during Wear vs Temperature test), a higher pad wear (44%, during Wear vs Temperature test), an improved crack resistance, and lower friction levels; however, more burnishing required for friction levels to stabilise.

The invention claimed is:

1. A method for producing a ductile iron alloy, comprising the steps of:
    i) heating steel scrap, pig iron, and further additives, wherein said further additives include one or more of a ferrosilicon alloy, a ferromolybdenum alloy, and a recarburiser, in a furnace heated to an internal temperature of between 1400° C. and 1700° C. to produce a molten mixture comprising:
        3.5% to 4.25% by weight carbon,
        2.4% to 2.5% by weight silicon,
        1% to 1.175% by weight molybdenum,
        0.039% to 0.05% by weight magnesium,
        about 0.07% by weight nickel,
        about 0.034% by weight chromium,
        up to 0.20% by weight manganese,
        up to 0.02% by weight phosphorus,
        up to 0.02% by weight sulfur, and
        iron to make 100% by weight;
    ii) transferring said molten mixture to an inoculation ladle, wherein 0.25% to 0.55% cerium by weight of the molten mixture is added to the molten mixture;
    iii) inoculating said molten mixture with an inoculant, wherein said inoculant includes one or more of ferrosilicon, calcium, aluminum, copper, and molybdenum, for a predetermined inoculation time to produce an inoculated molten mixture; and
    iv) pouring said inoculated molten mixture into a mold to produce the ductile iron alloy having a structure with a partial pearlitic structure, wherein said partial pearlitic structure is 30% to 50% of the structure.

2. The method according to claim 1, wherein said inoculant is covered to provide a controlled release of said inoculant in step (iii).

3. The method according to claim 1, wherein in step (iii), said predetermined inoculation time is between about 3 minutes and 10 minutes.

4. The method according to claim 1, wherein said inoculation ladle includes a pocket for housing said inoculant.

5. The method according to claim 1, wherein said inoculant is added to said inoculation ladle prior to step (ii).

6. The method according to claim 1, further comprising a step between steps (iii) and (iv) wherein said inoculated molten mixture is transferred from said inoculation ladle to a pouring ladle for pouring in step (iv), and wherein a second inoculant is added to said inoculated molten mixture during said transferring from said inoculation ladle to said pouring ladle.

7. The method according to claim 1, wherein said mold is for a vehicle part.

8. The method according to claim 1, wherein after molding, the ductile iron alloy is subjected to heat treatment wherein the molded ductile iron alloy is held at 550° ° C. to 700° C. for up to approximately 6 hours and then allowed to cool in a controlled manner to ambient temperature.

9. The method according to claim 1, wherein after molding, the ductile iron alloy is subjected to heat treatment, wherein the ductile iron alloy is held at 750° ° C. to 1000° C. for up to 10 hours and then allowed to cool in a controlled manner to ambient temperature.

10. The method according to claim 1, wherein said inoculant includes magnesium ferrosilicon.

11. The method according to claim 1, wherein said molten mixture comprises:
    3.5% to 3.75% by weight carbon,
    2.4% to 2.5% by weight silicon,
    about 1.175% by weight molybdenum,
    about 0.039% by weight magnesium,
    about 0.07% by weight nickel,
    about 0.034% by weight chromium,
    up to 0.20% by weight manganese,
    up to 0.02% by weight phosphorus,
    up to 0.02% by weight sulfur, and
    iron to make 100% by weight.

12. The method according to claim 2, wherein said controlled release occurs after substantially all of the molten mixture is transferred into the inoculation ladle.

13. The method according to claim 7, wherein said vehicle part is selected from the group consisting of disc brake rotors, turbo housings, camshafts, crankshafts, engine blocks, wheels, blocks, and carriages.

14. The method according to claim 13, wherein said vehicle part is a disc brake rotor.

15. The method according to claim 10, wherein said magnesium ferrosilicon inoculant comprises:
    5-6% by weight magnesium,
    44-45% by weight silicon,
    1.2-2.0% by weight calcium,
    0.8-1.0 by weight aluminum,
    0.8-1.0% by weight barium, and
    0.3-0.5% by weight cerium.

16. A method for producing an iron alloy, comprising the steps of:
    i) conducting the method according to claim 1;
    ii) collecting any waste remnants from the furnace and/or the inoculation ladle during step (i);
    iii) re-heating the collected waste remnants to produce a molten mixture; and iv) pouring said molten mixture into a mold to produce the iron alloy having a structure with a partial pearlitic structure, wherein said partial pearlitic structure is 30% to 50% of the structure.

17. A method for producing a ductile iron alloy, comprising the steps of:
i) heating steel scrap, pig iron, and further additives, wherein said further additives include one or more of a ferrosilicon alloy, a ferromolybdenum alloy, and a recarburiser, in a furnace heated to an internal temperature of between 1400° C. and 1700° C. to produce a molten mixture comprising:
3.5% to 4.25% by weight carbon,
2.4% to 2.5% by weight silicon,
1% to 1.175% by weight molybdenum,
0.039% to 0.05% by weight magnesium,
about 0.07% by weight nickel,
about 0.034% by weight chromium,
up to 0.20% by weight manganese,
up to 0.02% by weight phosphorus,
up to 0.02% by weight sulfur, and
iron to make 100% by weight;
ii) transferring said molten mixture to an inoculation ladle, wherein 0.25% to 0.55% cerium by weight of the molten mixture is added to the molten mixture;
iii) inoculating said molten mixture with an inoculant, wherein said inoculant includes one or more of ferrosilicon, calcium, aluminum, copper, and molybdenum, for a predetermined inoculation time to produce an inoculated molten mixture; and
iv) pouring said inoculated molten mixture into a mold to produce the ductile iron alloy having a structure with a partial pearlitic structure, wherein said partial pearlitic structure is 30% to 50% of the structure and wherein said mold is for a disc brake rotor.

18. The method according to claim 17, wherein the predetermined inoculation time is between about 3 minutes to 10 minutes.

19. A disc brake rotor formed by the method of claim 17.

* * * * *